United States Patent [19]

Bleazey et al.

[11] 4,344,166

[45] Aug. 10, 1982

[54] DRIVER ARRANGEMENT FOR STYLUS LIFTING/LOWERING APPARATUS

[75] Inventors: John C. Bleazey, Trenton; Joseph Guarracini, Lawrenceville, both of N.J.

[73] Assignee: RCA Corporation, New York, N.Y.

[21] Appl. No.: 204,384

[22] Filed: Nov. 5, 1980

[51] Int. Cl.³ .............................................. G11B 3/10
[52] U.S. Cl. .................................................... 369/216
[58] Field of Search ............... 369/215, 216, 246, 244, 369/224; 358/128.5; 179/100.4 R

[56] References Cited

U.S. PATENT DOCUMENTS 4,266,785  5/1981  Burrus ................................ 369/216

FOREIGN PATENT DOCUMENTS 54-51502  4/1979  Japan .................................... 369/246

Primary Examiner—Harry N. Haroian
Attorney, Agent, or Firm—E. M. Whitacre; J. S. Tripoli

[57] ABSTRACT

In a disc record player of the type which includes a turntable for rotatably supporting the disc record, a signal pickup device for recovering information signals from the disc, an elongated arm having the pickup stylus connected at one end and the other end coupled to the player, there is provided a selective stylus arm translating apparatus for moving the pickup arm toward and away from the disc record. The selective translating apparatus includes apparatus responsive to a player control signal for translating the stylus arm at a first rate and also comprises apparatus which is responsive to a condition of a signal recovered from the disc for translating the arm at a second rate.

7 Claims, 6 Drawing Figures

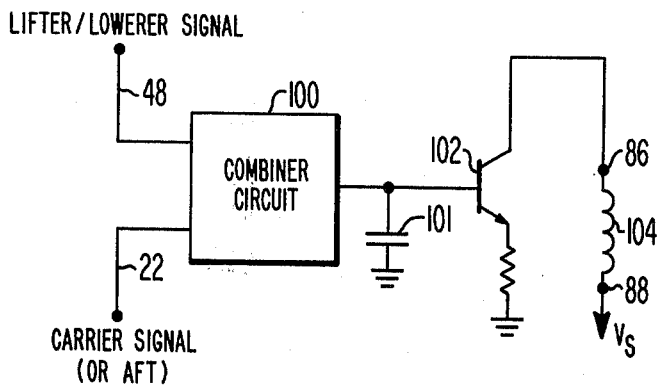
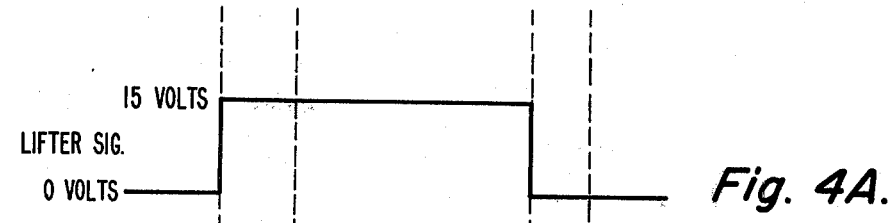
*Fig. 3.*
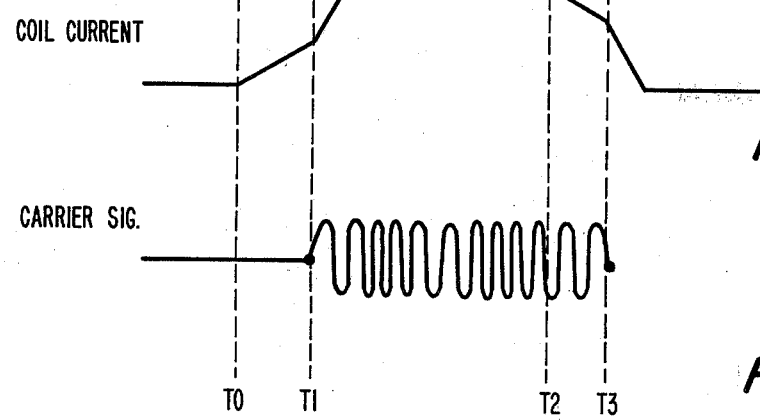
*Fig. 4A.*
*Fig. 4B.*
*Fig. 4C.*

DRIVER ARRANGEMENT FOR STYLUS LIFTING/LOWERING APPARATUS

The present invention relates generally to drive arrangements for stylus translating systems, and, more particularly, relates to drivers suitable for use in a video disc player.

In certain video disc systems, video information is recorded by means of geometric variations contained in an information track on a disc record. In capacitive type systems the information is recovered by permitting engagement of the information track with a stylus. The stylus, typically, has a conductive electrode which together with conductive properties of the record forms a capacitance which varies in accordance with the recorded information, corresponding to the geometric variations, when relative motion is established between the stylus and the record. The capacitance variations are converted to electrical signals by suitable circuitry.

In such systems, the stylus is generally located at one end of a stylus arm. The other end of the stylus arm is compliantly coupled to a support member such as a cartridge which is placed in a carriage. The carriage is made to traverse a path laterally over the record in a timed relationship to the rotation of the record. The compliant coupling of the stylus arm allows the stylus to pass through an opening in the bottom of the carriage to permit stylus/record engagement during playback.

In such systems, the stylus arm is usually made from a thin elongated member. In addition, the geometric variations which correspond to the recorded information have depths on the order of a fraction of a micron. The stylus/record system is, as a result of these and other factors, fragile.

A problem which has been encountered in such systems is damage to the information track when the stylus is let down onto the record and lifted up from the record. Video disc systems of this nature required gentle lowering and lifting of the stylus in order to avoid or at least minimize such damage. The stylus should not be suddenly dropped down onto a record which is already being rotated. In addition, the stylus should not be suddenly jerked off the record during the lifting operation. Since the stylus is supported on a long thin member, a sudden lift may cause an oscillatory motion of the stylus end of the arm whereupon pecking damage to the record could result. To further complicate the problem, disc records of the general type described above, are not always perfectly flat. As a result, when the stylus is being lowered onto the record, the stylus tip may touch the high point of the record as it comes around. This may cause the stylus to bounce several times on the record surface thereby causing damage. Likewise, when the stylus is to be raised away from the record, slowly lifting the stylus may cause the stylus to encounter a high point of the record and again cause bouncing of the stylus on the record surface. If, on the other hand, the stylus is lifted too rapidly off the surface of the disc, then, it has been discovered, that such rapid lifting tends to cause the aforementioned oscillatory motion of the stylus tip which again results in a pecking type of damage to the disc surface.

It is known in the prior video disc art, wherein an electromagnetic actuator is used to lift and lower a stylus arm, that a desirable drive signal to the coil of the actuator has a ramp type voltage waveform. See for example patent application Ser. No. 098,359 to Thomas W. Burrus, filed on Nov. 28, 1979 entitled "Stylus Lifting Lowering Actuator with Improved Electromagnetic Motor", now U.S. Pat. No. 4,266,785. It has been found that the utilization of a ramp waveform signal to the electromagnetic arm lifter is not completely satisfactory in the case of discs having a moderate amount of vertical runout. That is, discs which have a moderate amount of vertical height variation while being played will be damaged to some extent when the stylus arm is simply lowered onto the record at a uniform rate and raised up from the record surface at a uniform rate.

In accordance with the present invention, a selective stylus arm translating means is provided in a disc record player of the type comprising: a turntable for rotatably supporting the disc record, the disc record having information signals recorded thereon; a signal pickup device for recovering the information signals from the disc record; and elongated arm which has the signal pickup device connected at one end and the other end of the arm being coupled to the record player; and, means for selectively translating the arm whereby the pickup device may be selectively made to engage and disengage the disc record. The selective translating means comprises: a means which is responsive to a player control signal for translating the arm at a first rate and means responsive to a condition of a given signal which is recovered from the disc record for translating the arm at a second rate.

In the drawing:

FIG. 3 is a partial block and schematic diagram of a drive circuit in accordance with the present invention for use with the actuator of FIG. 2; and FIGS. 4A-4B comprise waveform diagrams helpful in explaining the operation of the present invention.

Figure 1:
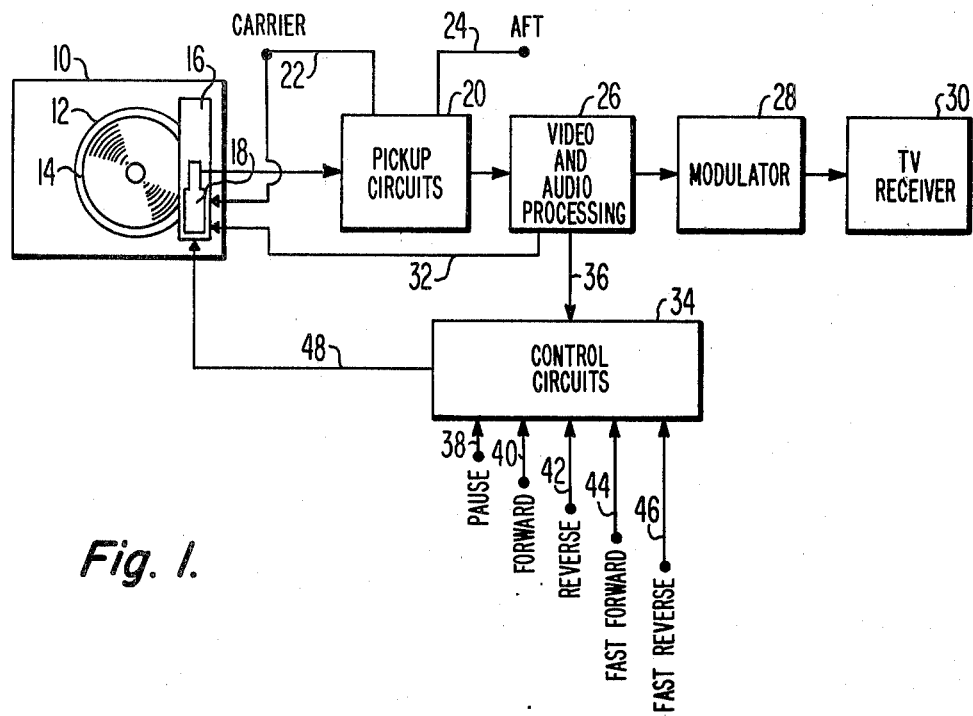
FIG. 1 is a block diagram of a video disc system which utilizes the present invention.

Referring now to FIG. 1, a video disc player 10 includes a turntable 12 for rotatably supporting a video disc record 14. The player 10 also includes a carriage 16 which accepts a cartridge 18. The carriage 16 is adapted to laterally translate the cartridge 18 in a radial direction across the record in a timed relationship with the rotation of the record 14. Located within the cartridge 18 is an elongated, thin stylus arm. The stylus arm has a stylus mounted at one end thereof and is compliantly coupled to a member at the rear end of the cartridge. The compliant mounting of the arm permits a degree of freedom in all directions including movement toward and away from the record 14. The carriage 16 includes an opening just below the position of the stylus so that when lowered the stylus will engage the surface of the record 14 for purposes of playback.

Typically, the signal recorded on the record is a composite color video signal which has been recorded in a frequency modulated format. This signal is processed via pickup circuits 20 which, among other things, detects the capacitance variations between the information track of the record and an electrode carried on the stylus and thereby provides a frequency modulated carrier signal which corresponds to the information recorded on the record. Thus, the pickup circuits 20 provide a signal which corresponds to the detected frequency modulated carrier signal. This signal is made available on line 22.

The pickup circuits 20 also include a resonant circuit which utilizes an automatic frequency tracking (AFT) signal which is derived from the detected signal for use in assuring that the proper operating point is utilized on the resonant frequency curve for proper recovery of the information signals carried on the disc. The AFT signal is available on line 24. For purposes of explanation of the present invention, the carrier signal is utilized in the embodiment of the invention described herein, however, it will be understood that the AFT signal may also be used in the practice of the present invention. The key point is that the present invention utilizes, in part, a condition of a signal which is ultimately derived from the disc.

The recovery frequency modulated signal is then provided to a means for video and audio processing 26. The video and audio processing circuitry demodulates the frequency modulated carrier provided from the pickup circuitry 20 as well as performing functions such as a time base correction and chroma and luminance processing. The processed signals from the unit 26 are then provided to a modulator 28 which modulates the processed composite color signal onto a carrier suitable for application to the antenna input terminal of TV receiver 30.

Within the video and audio processing circuitry 26 there are provided several output signals for various applications and functions. One such signal is provided on line 32 for purposes of driving an armstretcher mechanism which is located within the carriage 16. The armstretcher mechanism is driven in a fashion to minimize variations in the relative velocity between the stylus tip and the disc record. This is useful in reducing time base errors.

In addition the video and audio processing circuits provide an input signal to a control circuit means 34 via line 36. The control signal on line 36 may typically provide information for processing by the control circuits which corresponds to a number of functions. For example, the signal on line 36 may be a digitally encoded signal which corresponds to the field and/or frame number of the information presently being played by the player 10. In addition, the signal on line 36 may also have information corresponding to the program band being played on the player 10 or indeed it may provide a signal corresponding to the end of a given program band. In any event this signal on line 36 is provided to the control circuit means 34 which may include a microprocessor for system control.

The control mechanism 34 also receives input information from a series of pushbuttons which are usually located on the front panel of the video disc player. This information, as shown in FIG. 1, may comprise such items as pause, forward, reverse, fast forward and fast reverse which appear on lines 38-46 respectively. Some of these user originated commands will ultimately cause the stylus arm to be translated such that the stylus tip is made to engage or disengage from the record surface depending upon the nature of the command. Thus, there are internal player control signals which may come through on line 36 and/or external player control signals which may come through on lines 38 to 46. Some of which will constitute a command for translation of the stylus arm toward or away from the record 14. The signal from the control circuits 34 to the stylus arm lifting/lowering apparatus is provided on line 48.

Figure 2:
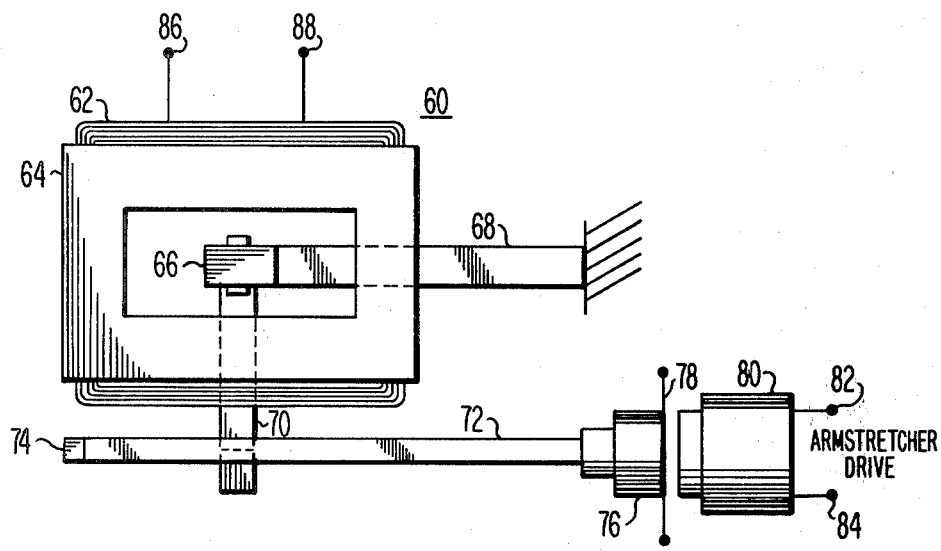
FIG. 2 is a diagram of an electromagnetic actuator for lifting and lowering the stylus arm of the video disc system of FIG. 1.

FIG. 2 shows a stylus arm lifting/lowering actuator which is located in the arm carriage 16 of FIG. 1. The actuator 60 comprises a coil of wire 62 wrapped around a non-magnetic core 64 to create a central volume. Within the central volume there is located a magnet 66. The magnet 66 is mounted on a leaf spring 68 which lies below the actuator core 64. Leaf spring 68 is typically fixed at one end. A stylus arm rest 70 extends out at a right angle from the leaf spring 68 beneath the core 64. The player stylus arm 72, having a stylus 74 at one end thereof, normally rests on the arm rest 70. The other end of the stylus arm 72 is compliantly mounted via a rubber coupler 76 to a flexible diaphragm 78. The armstretcher mechanism 80 is then brought into contact with the diaphragm 78 and under the influence of the armstretcher drive signal provided at terminals 82 and 84 the stylus arm may be moved in the longitudinal direction to compensate for relative velocity errors between the disc and the stylus.

The lifting/lowering mechanism 60 shown in FIG. 2 is arranged such that in the absence of command signals the stylus arm is kept above the record within the confines of the carriage 16. That is, the leaf spring 68 is arranged to bias the stylus arm in the raised condition in the absence of a command signal. The command signals to lower and raise the stylus are appied to the actuator via terminals 86 and 88. These terminals are formed at the ends of the coil 62. The arrangement shown in FIG. 2 is substantially the actuator which is shown and described in the aforementioned Burrus application. Typically, as described in the Burrus application, the drive signal applied between the terminals 86 and 88 comprises a signal having a ramp waveform. Heretofore, the ramp signals applied to terminals 86 and 88 have been uniform ramps so as to gently and smoothly lower and lift the stylus arm.

As indicated above, when dealing with records which have a moderate degree of vertical runout the uniform ramp approach may not be completely satisfactory.

In accordance with the theory of the present invention it has been discovered that it is desirable to supply a ramp waveform to the actuator terminals 86 and 88 having a first slope while the stylus arm is being lowered toward the record and then when contact is made between the stylus and the record thereby causing signal to be recovered from the record it is desirable to move the stylus arm rest quickly out of engagement with the stylus arm. Thus, it is desirable to provide a second ramp having a different slope to terminals 86 and 88 once the stylus has touched down. This is accomplished by detecting a signal which is on the record. Specifically, in the present embodiment, the previously mentioned, the AFT signal may also be used for this purpose.

Similarly, when it is desired to lift the stylus from the record, a first ramp signal is applied to the actuator terminals with a first slope so that the stylus arm rest rises gently and smoothly and comes into contact with the stylus arm 72. When the stylus arm rest contacts and thereby lifts the stylus arm 72, the pickup circuits will provide an indication of a lack of detected carrier. When the carrier disappears, because the stylus is out of contact with the record, it is desirable to rapidly translate the stylus arm so as to have the stylus tip get out of the way of any high spots due to vertical runout. Therefore, a second ramp signal having a second slope is applied to the actuator terminals when the loss of carrier is detected. As previously mentioned, there may be a problem with rapidly lifting the stylus arm 72 as soon as loss of carrier is detected in that there is a possibility of creating oscillatory motion of the stylus tip. If this is the case, then one could delay the onset of the rapid lift-off or the ramp voltage with the second slope for a short period of time.

FIG. 3 shows a specific drive circuit for the actuator of FIG. 2. The lifter/lowerer signal from the control circuits is applied via line 48 to one input terminal of combiner 100. The signal detected from the record, in this case a carrier signal, is supplied via line 22 to a second input terminal of combiner circuit 100. The output signal from combiner circuit 100 is provided at the base electrode of transistor 102. A capacitor is connected between the base electrode of transistor 102 and a point of reference potential, samely, ground. The collector electrode of transistor 102 is then connected to terminal 86 of the actuator mechanism 60. The coil 62 of the actuator is represented by the inductance 104 in the circuit of FIG. 3. The other end of the coil or the inductance 104 is connected at terminal 88 to a source of supply $V_s$.

The operation of the circuit shown in FIG. 3 may be understood with reference to the waveform diagrams shown in FIGS. 4A, 4B and 4C. For example, when the user wishes to play a video disc record, he will turn on the machine and perform the necessary sequence of operations which will ultimately conclude with a command signal being sent out via line 48 which will cause the stylus arm to be lowered thereby making contact between the stylus tip and record. The command signal is shown in FIG. 4A. When the waveform of FIG. 4A has s position transition from zerorolts to say 15 volts, the capacitor 101 begins to charge toward the 15 volt level and transistor 102 begins to turn on with the net result that a ramp current is generated through the coil winding to inductor 104. The coil current is shown in FIG. 4B between times T0 and T1. At time T1 the stylus tip has touched down on the record as shown by the detection of the carrier signal in FIG. 4C. The signal in 4C is provided to the combiner circuit 100 via line 22. This signal is processed in combiner circuit 100 to add to the signal provided on line 48 such that the capacitor 101 is made to charge at a faster rate toward its quiescent value. In practical terms, after the time of touch down at T1, current is flowing through the coil at a faster rate, therefore, the stylus arm rest will move further down and away from the stylus arm position at touchdown at a faster rate than that which took place between time T0 and time T1. In other words, once touchdown is achieved, the stylus armrest is rapily moved away.

At time T2 a signal such as pause control signal has been initiated and as a result there is a negative transition of the lifter signal on line 48. In response to this signal on line 48, the current in the coil begins to ramp down at a certain rate. Recall that the stylus actuator is biased to maintain the stylus arm rest and therefore the stylus in a condition away from the disc record. Therefore, as the current in the coil is reduced the stylus arm rest is slowly moving from an extreme position toward the stylus arm while stylus is still touching the disc. At time T3 the stylus arm rest has just made contact with the stylus arm and as a result the stylus tip has at this time been lifted from the surface of the record. Thus, as shown in FIG. 4C at this time the condition of the carrier signal is that it is no longer detected. When this happens the current through the coil is made to reduce at a faster rate and as a result of the spring forces, the stylus arm rest moves physically at a faster rate after time T3 as compared to the time interval between times T2 and T3.

Thus, in accordance with the present invention a drive system is provided for a stylus arm translating system wherein a signal derived from the record is utilized to control the speed of lifting and lowering in response to the condition of the detected signal. The condition being either the detection of the signal as a result of stylus record contact or the loss of the signal as a result of the disengagement of the stylus tip with the record.

Once again it is noted that in some applications it may be desirable on lift-off to delay the onset of the second ramp signal for a short period of time to prevent possible oscillatory motion of the stylus tip. However, even in instances where it is desirable to inject a slight time delay before the onset of the second ramp, it still will be desirable to utilize a ramp signal of a different slope to the actuator coil whenever dealing with a record having a fair degree of vertical runout.

The benefits of the present invention may also be realized in the context of video disc stylus shaping. Typically the diamond body is set down on a rotating disc having an abrasive layer (e.g., silicon dioxide) covering a groove which will shape the diamond body. Use of the present invention in this context would require the recording of a signal on the abrasive or lapping disc. In this case controlling lifting and lowering would help to prevent damage to both the stylus and the lapping disc.

What is claimed is:

1. In apparatus for use with a disc record, said apparatus being of the type comprising: a turntable for rotatably supporting said disc record, said disc record having signals recorded thereon; a signal pickup device for recovering said signals from said disc record; and means for selectively translating said arm whereby said pickup device may be selectively made to engage and disengage said disc record, said selective translating means comprising:

means responsive to an apparatus control signal for translating said pickup device at a first rate; and
   means responsive to a condition of a given signal recovered from said disc record for translating said pickup device at a second rate.

2. The disc record player according to claim 1 wherein said given recovered signal comprises a modulated carrier wave.

3. In a video disc player of the type comprising: a turntable for rotatably supporting a disc record, said disc record having information signals recorded thereon; a signal pickup stylus for recovering said information signals during playback; and an elongated arm having said stylus connected at one end thereof, the other end of said arm being coupled to said player, the apparatus comprising:

an electromagnetic actuator including a coil for generating a magnetic field when energized, an element arranged to move in response to the generation of said magnetic field, and a stylus arm rest connected to said element and adapted to receive said stylus arm, said stylus arm rest being biased to a rest position to prevent engagement of said stylus with said record in the absence of said magnetic field;

driver means connected to said coil for providing ramp signals in response to signals provided thereto;

combiner means having an output terminal connected to said driver means and having first and second input terminals;

means for coupling a player control signal to one input terminal of said combiner means whereby said driver means provides a first ramp signal having a first slope for translating said stylus arm rest in a plane perpendicular to said record at a first rate;

and means for coupling a signal derived from said record to the other input terminal of said combiner means whereby said driver means provides a second ramp signal having a second slope for translating said stylus arm rest in said plane at a second rate in response to a condition of said derived signal.

4. The apparatus according to claim 3 wherein said signal derived from said record comprises a modulated carrier wave.

5. The apparatus according to claim 3 wherein said signal derived from said record comprises an automatic frequency tracking signal.

6. The apparatus according to claim 3 wherein said stylus arm rest is translated toward said record at a first rate during the presence of only said control signal and at said second rate during the presence of said control signal and said derived signal.

7. The apparatus according to claim 3 wherein said stylus arm rest is translated in a direction away from said record toward said rest position at one rate after the termination of said control signal and at a second rate after the termination of said control signal and said derived signal.

* * * * *